G. A. MICKELSON.
PROPELLING GEAR FOR TRUCKS.
APPLICATION FILED APR. 20, 1909.
934,685.
Patented Sept. 21, 1909.
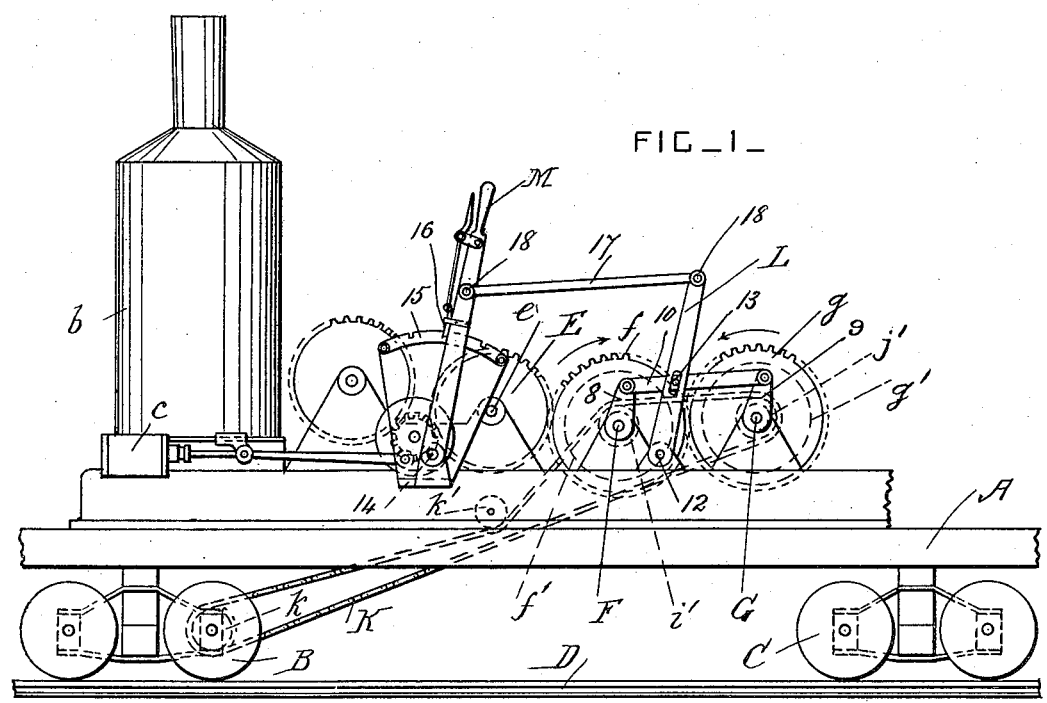
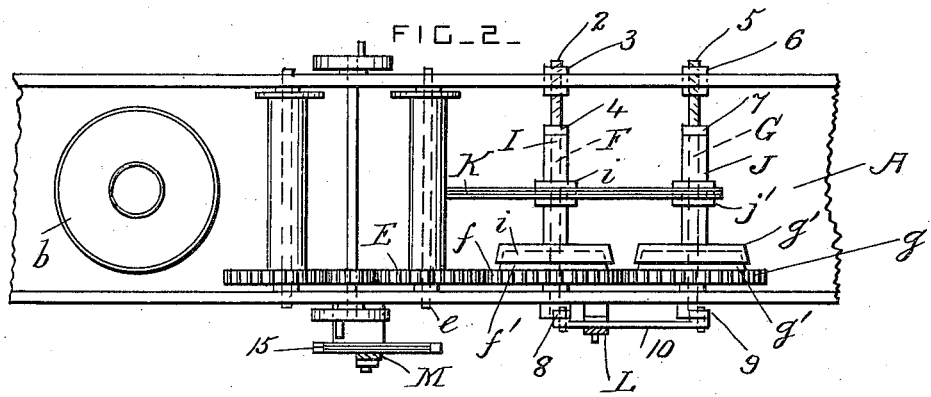
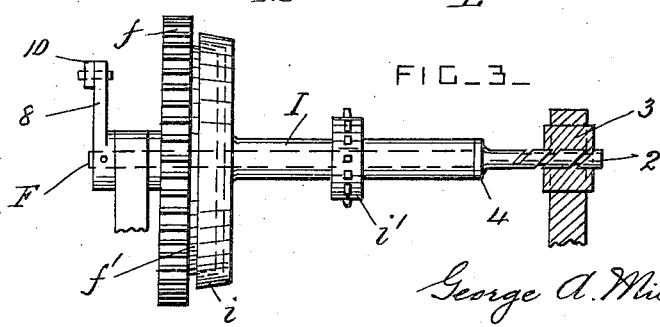
Witnesses
L. B. Middleton
Wm H Bates
Inventor
George A. Mickelson
By Herbert W. T. Jenner.
Attorney

UNITED STATES PATENT OFFICE.

GEORGE ARTHUR MICKELSON, OF SPOKANE, WASHINGTON.

PROPELLING-GEAR FOR TRUCKS.

934,685. Specification of Letters Patent. Patented Sept. 21, 1909.

Application filed April 20, 1909. Serial No. 491,150.

*To all whom it may concern:*

Be it known that I, GEORGE A. MICKELSON, a citizen of the United States, residing at Spokane, in the county of Spokane and State of Washington, have invented certain new and useful Improvements in Propelling-Gear for Trucks; and I do hereby declare the following to be a full, clear, and exact description of the invention, such as will enable others skilled in the art to which it appertains to make and use the same.

This invention relates to driving gear for propelling the trucks of derricks or cranes along railroad rails; and it consists in the novel construction and combination of the parts hereinafter fully described and claimed.

In the drawings, Figure 1 is a side view of portions of the truck of a portable derrick or crane, showing the propelling mechanism applied to it. Fig. 2 is a plan view of the propelling mechanism. Fig. 3 is a detail view of one of the clutch devices.

A is the body portion of a truck provided with front wheels B and rear wheels C which run upon rails D. Any approved form of derrick or crane is mounted on the truck A and is driven by any suitable engine and boiler.

The cylinder $c$ of the engine is driven from the boiler $b$ in the usual way, and the engine is operatively connected with a toothed driving wheel E mounted on a shaft $e$ which runs in suitable bearings on the truck. This wheel E may be a portion of the hoisting mechanism.

F and G are two shafts also journaled in bearings on the truck parallel to the shaft $e$. A toothed wheel $f$ is journaled on the shaft F and gears into the wheel E. A toothed wheel $g$ is journaled on the shaft G and gears into the wheel $f$. The wheels $f$ and $g$ run in opposite directions as indicated by the arrows in Fig. 1. The wheel $f$ has a friction clutch-member $f'$ secured to it; and the wheel $g$ has a friction clutch-member $g'$ secured to it.

I is a sleeve journaled on the shaft F and provided with a clutch-member $i$ for engaging with the clutch-member $f'$. A sprocket-wheel $i'$ is also secured on the sleeve I. A sleeve J is journaled on the shaft G and is provided with a clutch-member $g'$. A sprocket-wheel $j'$ is also secured to the sleeve J and is arranged in the same plane as the sprocket-wheel $i'$.

K is a drive-chain which passes over the two sprocket-wheels $i'$ and $j'$ and over a sprocket-wheel $k$ secured on the axle of one of the truck wheels. This sprocket-wheel $k$ may be secured to one of the front wheels B or to one of the rear wheels C, or both wheels B and C may be provided with similar driving devices. A guide and tightener sheave $k'$ is provided and bears against the drive-chain K.

The shaft F is provided with a screw-threaded portion 2 which engages with a nut 3 on the truck or frame, and 4 is a collar on the shaft F for pressing the sleeve I endwise.

The shaft G is provided with a screw-threaded portion 5 which engages with a nut 6 on the truck or frame, and 7 is a collar on the shaft G for pressing the sleeve J endwise. One of the screwthreaded portions is made with a right-hand thread and the other with a left hand-thread, and each thread is of large pitch.

A short lever 8 is secured on the shaft F, and a short lever 9 is secured on the shaft G. A coupling-rod 10 is pivoted between the end portions of the levers 8 and 9.

L is a long lever pivoted by a pin 12 at its lower part to the truck or frame, and having its middle part pivotally connected with the coupling-rod 10 by a pin 13.

M is the reversing-lever of the propelling mechanism. This lever M is pivoted to the truck or frame by a pin 14, and it is provided with a notched quadrant-plate 15 and a catch 16 of approved construction for holding it in position. A connecting-rod 17 is pivotally connected to the lever L and M by pins 18. The toothed wheels are driven constantly by the engine. When the operating lever M is in its middle position both clutches are out of engagement and the chain or sprocket-wheels are not revolved. When the lever M is moved in one direction it puts one clutch in gear, and when moved in the other direction it puts the other clutch in gear, so that one or the other of the sprocket driving wheels is caused to operate the drive-chain and propel the truck.

The direction in which the truck is propelled is determined by the toothed wheels $f$ and $g$ which run in opposite directions, and which are coupled with the sleeves so as to operate the drive-chain by means of the clutches hereinbefore described.

Any other approved shifting mechanism, for sliding the clutch-members simultaneously in opposite directions, may be used in carrying out this invention instead of the screwthreaded shafts and nuts hereinbefore described.

What I claim is:

1. The combination, with a truck, and rail-wheels supporting it; of a driving wheel carried by the truck, two toothed propelling wheels mounted on the truck and gearing into each other so that they revolve in opposite directions, one of the said propelling wheels being driven by the said driving wheel, two sprocket-wheels mounted on the axes of the two said propelling wheels respectively and arranged in the same plane with each other, a sprocket-wheel connected to one of the said rail-wheels, an endless drive-chain passing over the said sprocket-wheels, clutches arranged between the two said propelling wheels and the sprocket-wheels pertaining to them, and reversing mechanism for placing the clutches in engagement alternately to propel the truck forward or rearward.

2. The combination, with a truck, and rail-wheels supporting it; of a driving wheel carried by the truck, two toothed propelling wheels mounted on the truck and gearing into each other so that they revolve in opposite directions, one of the said propelling wheels being driven by the said driving wheel, two sprocket-wheels mounted on the axes of the two said propelling wheels respectively and arranged in the same plane with each other, a sprocket-wheel connected to one of the said rail-wheels, an endless drive-chain passing over the said sprocket-wheels, friction clutches arranged between the two said propelling wheels and the sprocket-wheels pertaining to them, shafts provided with right and left hand screwthreaded portions and nuts for placing the clutches in engagement alternately, short levers secured to the said shafts, a coupling-rod pivoted between the said short levers, and an operating lever pivotally connected with the said truck and coupling-rod.

In testimony whereof I have affixed my signature in the presence of two witnesses.

GEORGE ARTHUR MICKELSON.

Witnesses:
 FRANK BOYLE,
 GEORGE WASHINGTON NOLAN.